(12) United States Patent
Wan

(10) Patent No.: US 6,456,193 B1
(45) Date of Patent: Sep. 24, 2002

(54) CONTROLLING METHOD AND APPARATUS OF CONSTANT-FREQUENCY SOUND-PRODUCTION OF ELECTRICAL HORN

(76) Inventor: Yu Wan, No. 1, High Technology Development Zone, Ganshui Rd., Haerbin City, Heilongjiang Province, 150036 (CN)

( * ) Notice: Subject to any disclaimer, the term of this patent is extended or adjusted under 35 U.S.C. 154(b) by 0 days.

(21) Appl. No.: 09/463,483
(22) PCT Filed: Jul. 28, 1998
(86) PCT No.: PCT/CN98/00135
§ 371 (c)(1), (2), (4) Date: Mar. 14, 2000
(87) PCT Pub. No.: WO99/06989
PCT Pub. Date: Feb. 11, 1999

(30) Foreign Application Priority Data

Jul. 29, 1997 (CN) .......................... 97112878 A

(51) Int. Cl.⁷ ................................. G08B 3/00
(52) U.S. Cl. ............... 340/384.1; 340/384.5; 340/384.73; 116/137 R; 116/142 R
(58) Field of Search .............. 340/384.1, 384.73, 340/539, 384.7, 309.15, 326, 384.5; 310/316.01, 317; 630/117; 116/137 R, 142 R

(56) References Cited

U.S. PATENT DOCUMENTS 4,687,962 A * 8/1987 Elbert .................... 310/316
5,266,921 A * 11/1993 Wilson ................... 340/388
5,422,602 A * 6/1995 Werrbach ................ 330/281
5,754,095 A * 5/1998 Bader et al. ........... 340/384.7
5,757,305 A * 5/1998 Xydis .................... 341/173

FOREIGN PATENT DOCUMENTS

| CN | 1152159 | 6/1997 |
| EP | 0188196 | 7/1986 |
| WO | 93/15500 | 8/1993 |

* cited by examiner

Primary Examiner—Jeffery Hofsass
Assistant Examiner—Davetta W. Goins
(74) Attorney, Agent, or Firm—Burns, Doane, Swecker & Mathis, L.L.P.

(57) ABSTRACT

A controlling method and apparatus of constant-frequency sound-production for an electric horn are described. These are achieved. And comprised by a monolithic-processor. It's characterized in that frequency pulse output from constant-frequency oscillator is collected as base resonant frequency of each horn (accuracy at least +0.05 HZ), thereby the horns can operate in optimum condition driven by electric driving signal, duty cycle of the driving signal can be arbitrarily adjusted in the range of 1–99% based on sound production feature of different horns. It overcomes the shortcomings that sound changing and sound level descending may arise under the influence of environmental temperature and motor vehicle's voltage variation in the horn with contact and various present electric horns. It also can be used as a signal source having adjustable frequency and pulse width.

18 Claims, 3 Drawing Sheets

CONTROLLING METHOD AND APPARATUS OF CONSTANT-FREQUENCY SOUND-PRODUCTION OF ELECTRICAL HORN

The present invention relates to an electric horn of a motor vehicle, and particularly to a controlling method and apparatus of constant-frequency sound production for the electric horn. This invention also relates to a method for producing a signal source which has constant-frequency and continuous, adjustable duty cycles.

Nowadays, the basic sound-production theory for an electric horn of a motor vehicle is that the horn uses an electromagnget to drive a diaphragm, which then pushes the air and produces sound. The attractions of the electromagnet in that kind of horns are controlled by a contact. When the horn works, since the contact is operating at a very high frequency (generally 300–600 Hz), the on-off of the large electric current may generate a big spark. The corrosion of the contact caused by the electric spark makes the horn short life and at the same time continuously makes it deviate from the standard frequency and sound level both of which are set when the horn is off the production line. It brings about some disadvantages such as sound variations, sound reduction, and noise increase. Furthermore, it is very difficult to make the sounding frequency consistent with the inherent mechanical resonant point (frequency) of the horn to achieve the maximum sounding efficiency and maximum energy savings. In recent years with the developments of the electronic technology, various kinds of electronic devices have been invented to replace the contact, wherein an electric circuit instead of the contact is used to generate pulse currents (signals) for the electromagnet to drive the diaphragm. However, since they are adjusted in accordance with the inherent mechanical resonant point of each horn individually, all the electronic devices are constituted by circuits with their frequencies adjusted via resistors and capacitors, such as various kinds of multi-harmonic oscillators, time-base circuits, pulse width adjusting and controlling circuits. Since this kind of circuit is influenced by temperature and voltage features of semiconductor devices and resistors and capacitors, its output frequency being influenced by the environmental temperature and the motor vehicle's voltage, it can not be kept stably at the frequency consistent with the inherent mechanical resonant frequency of the horn. Therefore, although the above said horn has a longer life than the horns with a contact, it still has some disadvantages For example, the variations of the environmental temperature and the motor vehicle's voltage result in changes of the driving frequency of the circuit which finally cause the frequency of the horn sound to change and the output sound level greatly reduce. So far it has not been used widely.

A quartz crystal oscillator or a highly stable oscillator within some semiconductor chips has high stability of frequency, generally up to several dozens of PPM, but it can only generate a frequency of 2-1/N when using ordinary frequency dividing method. However, the inherent mechanical resonant frequency of a horn is at a frequency point between 300 and 600 HZ, therefore these general frequency dividing methods can't be used here. Although frequency division can be effected by a digital voltage controlled oscillator (VCO), it exists a problem that the pulse width can not be arbitrarily adjusted. So it is not applicable to be used in a horn for its too high cost relative to a horn and its complicated adjusting method.

An object of the invention is, with respect to the problems in the prior art, to design and provide a method and apparatus which uses a constant-frequency oscillator such as a quartz crystal oscillator to generate a stabilized reference signal, then via a monolithic-processor controls the reference signal, corrects its frequency according to the inherent acoustic parameters of each horn to generate a driving signal, and then makes the horn to achieve the optimum sounding effect when driven by the generated electronic driving signal, thereby overcomes the problems such as the sound variations (frequency variations) and unstable output sound level which are not solved in the prior art.

According to the first aspect of this invention, there is provided a control method of constant-frequency sound production for an electric horn, the above said method includes the following steps: generating a reference pulse signal of a constant frequency; pre-dividing the reference pulse signal generated by the generating step into a predetermined level which is near a certain frequency at the work frequency range of the horn; correcting the frequency of the pulse signal generated in the step of pre-dividing based on the predetermined frequency parameters of the horn so as for the frequency of output pulse signal to be consistent with the said certain frequency; adjusting the duty cycle of the frequency-corrected pulse signal based on the predetermined duty cycle parameters so as for the horn to achieve the optimum sounding characteristics; buffering and power-amplifying the signal output from the duty cycle correcting unit; then sending the buffered and amplified pulse signal into the electric horn to drive the electric horn to work.

In the above first aspect of this invention, the said certain frequency in the frequency correcting step is the mechanical resonant frequency of the electric horn.

According to the second aspect of this invention, there is provided a controlling method of constant-frequency sound production for an electric horn by microprocessor, the said method includes the following steps: generating a reference pulse signal of constant frequency; according to the predetermined frequency parameters of the horn and the predetermined duty cycle parameters, simultaneously adjusting the frequency and the duty cycle of the generated reference pulse signal using the microprocessor so that the pulse signal generated subsequently has a predetermined frequency and duty cycle, wherein the said predetermined frequency which is very near the mechanical resonant frequency and in the electric horn's working frequency range, the predetermined duty cycle is enough for the horn to achieve the optimum sounding characteristics; buffering and power amplifying the signal output from the adjusting step; then sending the buffered and amplified frequency signal into the electric horn so as to drive the electric horn to work.

According to the third aspect of this invention, there is provided an control apparatus of constant-frequency sound production for an electric horn, the said apparatus includes: a reference signal generating unit for generating a reference pulse signal of constant frequency; a pre-dividing unit for pre-dividing the reference signal generated by the reference signal generating unit into a predetermined level which is near a frequency in the working frequency range of the electric horn; a frequency correcting unit for correcting the frequency of the pulse signal generated in the pre-dividing unit based on the predetermined frequency parameters of the horn so that the output pulse signal frequency is consistent with a certain frequency within the working frequency range of the electric horn's diaphragm; a duty cycle adjusting unit for adjusting the duty cycle of the frequency-corrected pulse signal based on the predetermined duty cycle parameters so as for the horn to achieve the optimum sounding characteristics; a buffering and amplifying unit for buffering and power amplifying of the signal output from the duty cycle correcting unit; then sending the buffered and amplified pulse signal into the electric horn to drive the electric horn to work.

In the said apparatus in the above third aspect of this invention, the said pre-dividing unit, the said frequency correcting unit and the said duty cycle adjusting unit may be implemented by a monolithic-processor, and also may be constituted by a microprocessor or a which includes CPUL, I/O, RAM, ROM (EPROM, EEPROM, FLASH or other devices having similar memory function) or other similar devices. Furthermore, in the case that the monolithic-processor circuit's normal. work is not affected, the horn according to the invention can used as a horn having variable sound level by changing the apparatus's supply voltage and thus controlling the output sound level of the electric horn.

According to the forth aspect of this invention, there is provided a method generating a signal source having constant frequency and adjustable duty cycle using a microprocessor, the said method includes the following steps: generating a reference pulse signal of constant frequency; pre-dividing the reference pulse signal generated in the step of generating reference signal so as for the pre-divided pulse signal frequency to fall into a predetermined working frequency range; correcting the frequency of the pulse signal generated in the step of pre-dividing based on the predetermined working frequency so as for the output pulse signal frequency to be consistent with the required work frequency; adjusting the duty cycle of the frequency-corrected pulse signal based oil the predetermined duty cycle.

In the forth aspect of this invention, the adjusting range of the said duty cycle in said method of generating signal source may be 1%–99%.

Compared with the prior art, this invention has the following advantages:

1. In this invention, a constant-frequency oscillator (such as quartz crystal) is used to generate a constant reference pulse signal, a monolithic-processor is adopted to control the pulse signal via software programs to generate a special signal, the frequency of which is consistent with the horn's full-band sounding characteristics and the special pulse width of which is generated by software programs, then make a correction based on the data of each horn in a memory, amplify and sequentially drive the electromagnetic diaphragm of the horn to sound. It resolves the problems existing in common methods which can't arbitrarily divide the frequency of signals output by constant-frequency oscillator (such as quartz crystal oscillator). And also it has some advantages over the digital voltage controlled oscillator (VCO), the VCO may resolve the problem of frequency division, but it can't resolve the problem of adjusting the pulse width arbitrarily, in the meantime the cost of VCO is too high relative to a horn, therefore VCO is not suitable to be used in the horn.

2. The horn according to the invention has a long life, and overcomes the shortages existing in a conventional horn with a contact, such as sound variations and volume reduction when its frequency and sound level continuously deviate from the standard values set at the time of being off the production line, therefore the maximum sounding efficiency and electricity savings may be achieved. At the same time, it also overcomes the weaknesses that when an electronic device is used to replace the contact the changing of output frequency influenced by the environmental temperature and voltage of a motor vehicle leads to sound variations and output sound reductions.

3. This invention can serve several purposes. Besides being used as a given motor vehicle's electric horn which is driven by a signal having constant frequency and adjustable duty cycle, the apparatus according to the invention, even in the case that the voltage supplied by motor vehicle changes greatly, can keep a constant frequency output signal and only the output sound level is changed correspondingly, for example, a constant-frequency electric horn having a 12V nominal voltage and sounding under the control of a monolithic-processor can work stably at a range of 6.5~16V, thereby resolving the problems that can't be resolved by various horns in the prior art in which its diaphragm is driven by an electromagnet. Since the frequency of its output signal is unrelated to voltage and the sound level of the output signal varies corresponding to the variations of the input voltage, it can be used as a sound-level-variable horn by changing the input voltage. Sounding with a lower sound level is preferred in a city in order to reduce the environmental pollution, and sounding with its higher sound level may be used in a noisy environment in order to ensure the traffic safety. Furthermore, it can be used as a signal source, with both the frequency and pulse width adjustable.

Various advantages of this invention will be more readily apparent from the following descriptions in conjunction with the accompanying drawings. The identical or similar elements in the drawings will be marked with an identical reference numeral.

Figure 1:
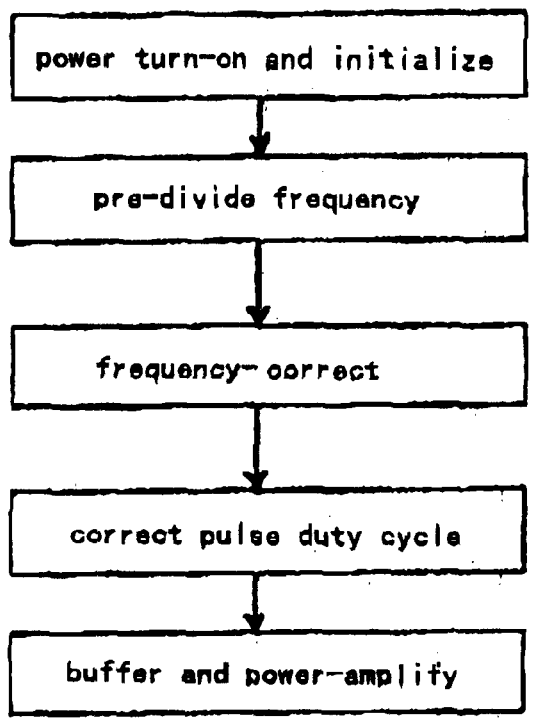
FIG. 1 is a flow chart which shows a control method of constant-frequency sound production for an electric horn according to the invention.

Firstly referring to FIG. 1, it shows a flow chart of a control method of constant-frequency sound production for an electric horn according to the invention. The method is implemented by electronic elements such as a monolithic-processor. Firstly, there are a series of preparation steps which include: turning on power and initializing, activating the constant frequency oscillator (quartz crystal oscillator or self-contained oscillator of monolithic-processor), resetting each register within the monolithic-processor at the same time, and setting each port of the monolithic-processor to be cat input or output status according to its specified requirements. Then it proceeds to the step of frequency pre-division, in which the high frequency signal generated by the constant frequency oscillator is pre-divided into a setting level using some registers of the monolithic-processor according to the predetermined frequency in the horn working range set by programming, and said setting level should be in the range of the horn working frequency or near it. Next, it proceeds into the step of frequency correcting. At that step the frequency of the pre-divided pulse is corrected accurately according to the acoustic performance parameters of the horn so as to make the output pulse frequency consistent with each horn's mechanical resonant frequency, generally the accuracy being +0.05Hz. Of course, the frequency of the divided-and-corrected output pulse also may be other frequency in the work range of the electric horn, so long as it can meet the objective that the horn achieves its optimum sounding. The specific way of frequency division and correction is to use the monolithic-processor via software to prolong or shorten the duration of high level and low level between different frequencies in a period respectively. Then it proceeds into the step of correcting the pulse duty cycle, according to the optimum pulse duty cycle of each horn stored previously, the ratio of the duration of high level and low level of the pulse signal after the step of dividing and correcting are modified, making the horn to achieve its optimum sounding characteristics. Said optimum sounding characteristics here mean a certain sounding effect which is determined for a certain type of horn. At first the horn is monitored subjectively many times and the sounding frequency spectrum of the horn is measured and then the subjective monitor results and measurements are compared and evaluated repetitively, finally the optimum sounding characteristics are obtained. They are not a fixed value, and can vary slightly. Here, the duty cycle of the pulse (driving signal) may be arbitrarily adjusted in the range of 1%~99%, and different duty cycle parameters may be selected according to the sounding characteristics of different horns. Afterwards, it proceeds to the step of buffering and magnifying, in which the pulse signal output from the monolithic-processor is buffered, and the current of the buffered pulse signal is magnified to drive the electromagnetic coil of the horn. Finally, the buffered and magnified pulse signal drives the electric horn to generate sound.

According to the invention a highly stable exterior or built-in oscillator of a semiconductor chip is used to generate a reference signal of constant level. The reference signal is controlled by the monolithic-processor via the instruction (or software) to produce pulse signal which is in accordance with the full-band sounding characteristics of a horn and having a certain pulse width, and is then corrected according to the data of each horn stored in the memory and amplified to let the electromagnet drive the diaphragm to produce sound. Alternatively, the frequency characteristics of a certain kind of horn diaphragm may be partly or wholly solidified in the chip, from which a signal having an optimum pulse width which is suitable to the characteristics of a horn diaphragm may be selected via a frequency adjusting and setting device.

Figure 2:
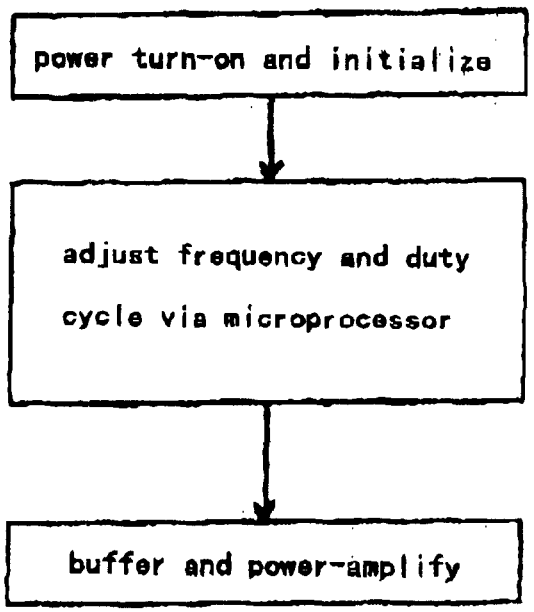
FIG. 2 is a flow chart which shows another control method of constant-frequency sound production for an electric horn via microprocessor according to the invention.

FIG. 2 is a flow chart that shows another control method of a constant-frequency sound production for an electric horn via a microprocessor according to an embodiment of the invention. This embodiment and the embodiment shown in FIG. 1 differ in that, in this embodiment, the microprocessor adjusts the frequency and duty cycle of the generated reference signal in the same step according to the selected horn frequency parameters and duty cycle parameters, so that the reference signal is directly transformed to the pulse signal having selected frequency and duty cycle. That is to say, the step of pre-dividing frequency, the step of frequency correcting and the step of correcting duty cycle shown in FIG. 1 are replaced by one step. It can be conducted specifically as follows: the duration of high level and low level of the required driving signal is calculated using the monolithic-processor or microprocessor from the working frequency parameters of an electric horn to be controlled and duty cycle parameters in optimum working condition which are stored in memory (these parameters may also be pre-set by instruction or within a register), then the reference signal generated previously is processed by means of time-delaying or counting to be transformed into a driving pulse signal having the required frequency and duty cycle, so as to. drive the electric born.

Figure 3:
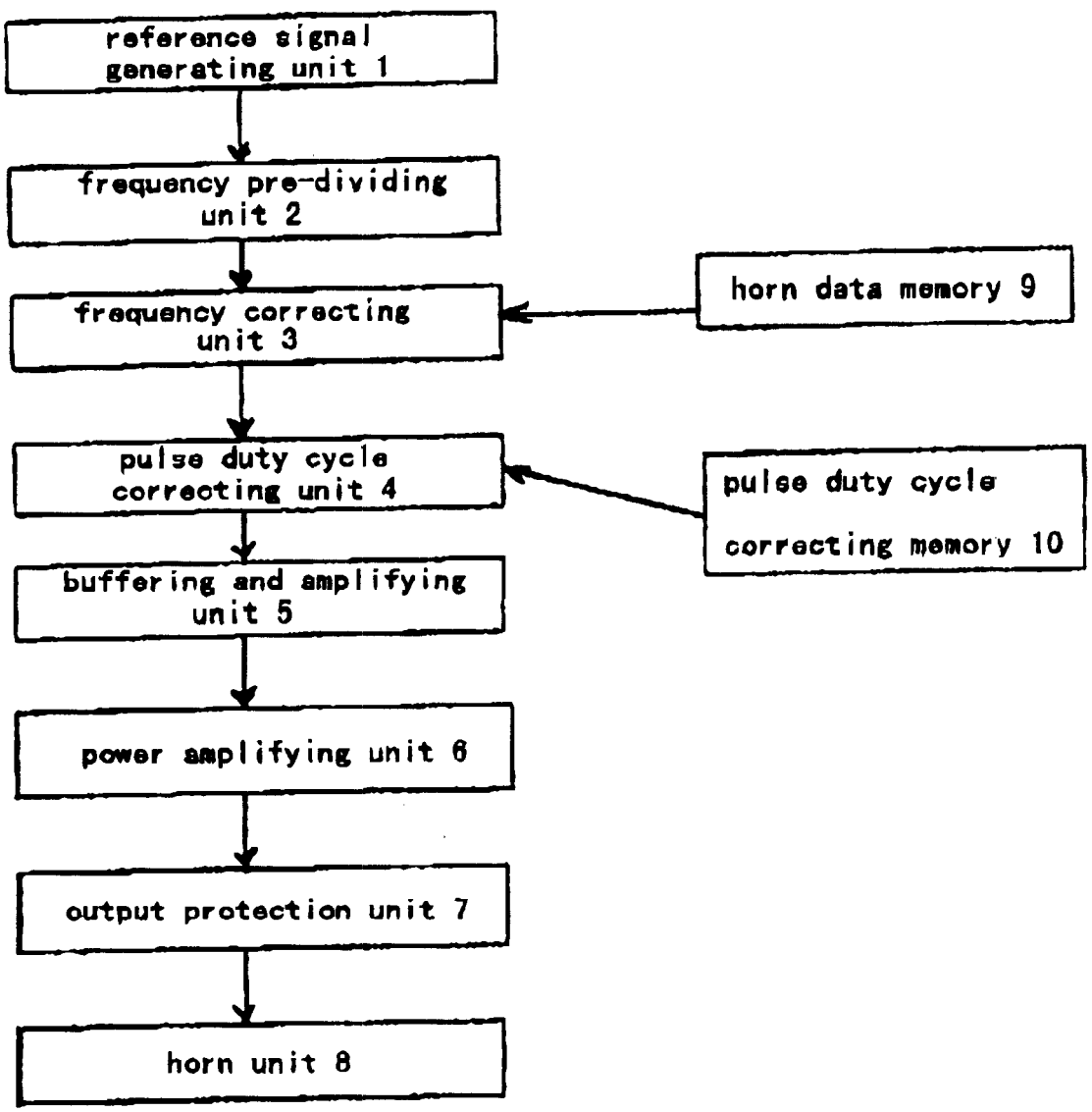
FIG. 3 is a schematic diagram which shows a control apparatus of constant-frequency sound production for an electric horn according to the invention.

FIG. 3 is a schematic diagram that shows a control apparatus of constant-frequency sound production for an electric horn according to the invention. After the control apparatus is turned on, the reference-signal generating unit 1 generates a reference signal of constant frequency and outputs it to the frequency pre-dividing unit 2, which pre-divides the input reference signal into a predetermined level which is near a frequency in the range of the standard electric horn working frequency and sends the resultant signal into the frequency correcting unit 3. The frequency correcting unit 3 reads the selected horn frequency parameters from the horn data memory 9, and adjusts the frequency of the pulse signal generated in the pre-dividing unit 2 according to the frequency parameters, so that the frequency of output pulse signal is in accordance with the certain frequency in the range of the electric horn working frequency, The duty cycle correcting unit 4 receives the frequency-corrected pulse signal, and reads the selected duty cycle parameters from the pulse duty cycle correcting memory 10, then adjusts the duty cycle of the frequency-corrected pulse signal according to the selected duty cycle parameters, so that the horn achieves its optimum sounding characteristics. The buffering-and-amplifing unit 5 receives the pulse signal from the duty cycle correcting unit 4, than buffers and amplifies the pulse signal, the buffered-and-amplified signal is power-amplified through the power amplifying unit 6 and is sent to the electric horn unit 8 via the output protection circuit 7, to drive the electric horn to work. The function of the horn data memory 9 and the pulse duty cycle correcting memory 10 may be implemented by else same memory unit, or by different memory units.

Figure 4:
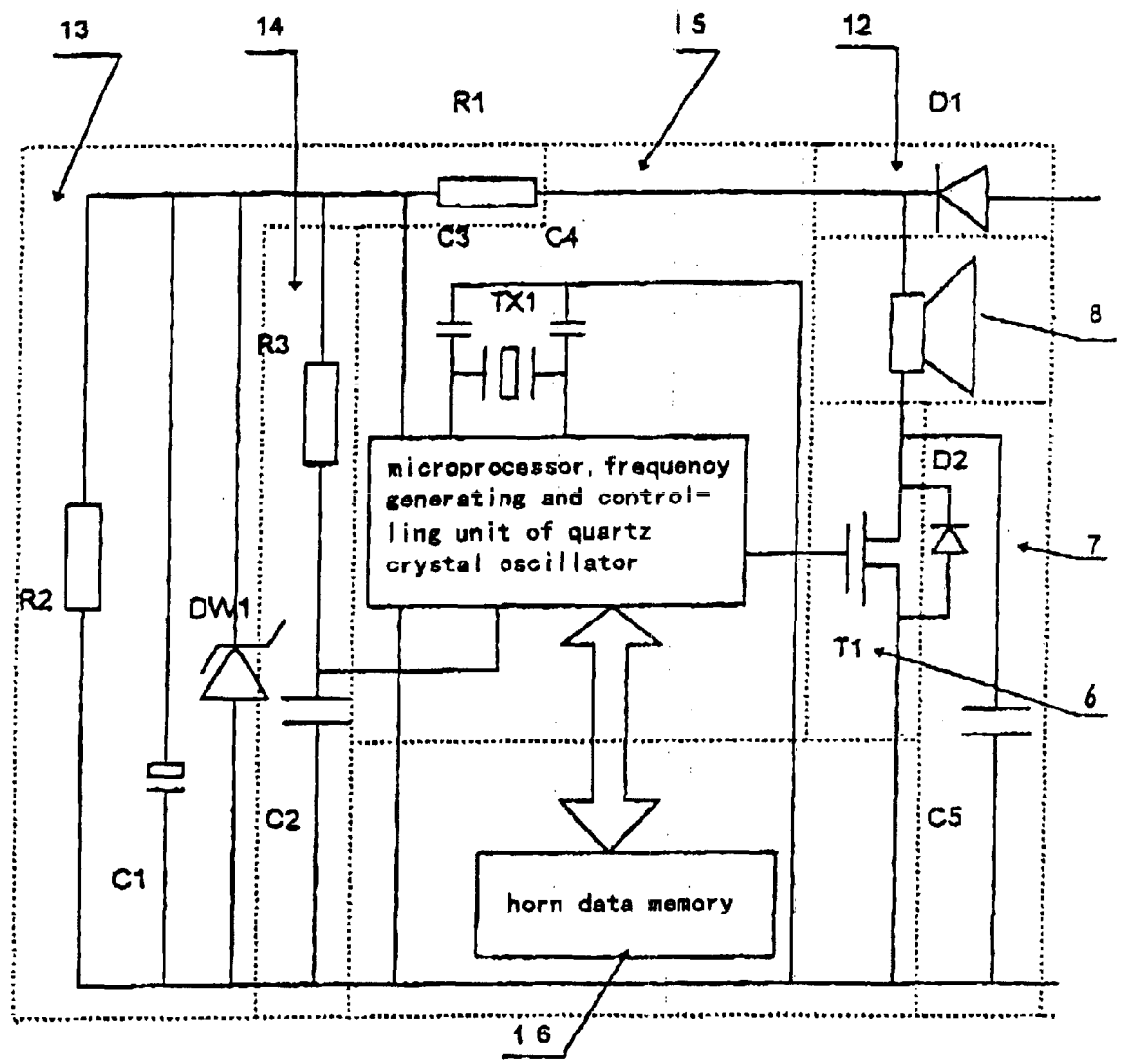
FIG. 4 is a circuit diagram which shows a preferred embodiment of an apparatus for controlling constant-frequency sound production for an electric horn according to the invention.

FIG. 4 is a circuit diagram that shows the preferred embodiment of a control apparatus for controlling constant-frequency sound production for an electric horn according to the invention. In the apparatus of this preferred embodiment, resistor R1 (or called as current limiting resistor), R2 (or called as voltage division discharging resistor), capacitor C1 (or called as decoupling filter capacitor) and voltage regulation diode DW1 together constitute a power supply regulated filter circuit 13. Resistor R3 and capacitor C2 constitute power turning-on and resetting circuit 14. Diode D1 constitutes opposite-electrode-proof connection circuit 12. Diode D2 and capacitor D5 constitute a overvoltage protection circuit 7 of the horn unit 8, wherein C5 is used to absorb the positive overvoltage generated by the horn electromagnet under the pulse excitation, to protect a field effect transistor or a darlington transistor at the power output stage. The power amplification driving circuit of the power amplification unit 6 can use a field effect transistor T1 (or a darlington transistor).

In FIG. 4, the power supply unit 11 is constituted with opposite-electrode-proof connection circuit 12, power supply regulation and filtering circuit 13 and power turning-on and resetting circuit 14, wherein the output of the power supply regulation and filtering circuit 13 is connected to the power supply input of the monolithic-processor 15. the signal outpul terminal of which is connected to the horn unit 8 via the power amplification driving circuit T1 of the power amplification unit 6 and the output protection unit 7 and the data terminal of which is connected to the horn data memory device 16. The horn data memory device 16, which is constituted with a horn data memory unit 9 (see FIG. 3) and pulse duty cycle correcting memory unit 10 (see FIG. 3) and is mainly used to store the frequency characteristic parameters of each horn achieved at adjustment, can be constituted with ROM, EPROM, EFPROM, FLASH or other exterior or built-in data storage devices of the monolithic-processor, such as fuse arrays, switch arrays, pin arrays. The circuit of the preferred embodiment according to this invention is specified as follows: when the power supply is switched on according to the electrode requirement of this circuit, the input voltage is divided via the diode D1 of the opposite-electrode-proof connection circuit 12 and the regulated filter circuit 13 which is constituted by R1, R2, DW1, C1, into a lower voltage, which is then used as the power supply suitable for the monolithic-processor system, wherein C1 is used to eliminate the pulsing component when the horn works, The power turning-on and resetting circuit 14, which is constituted by R3, C2, delays the provision of power turning-on to the monolithic-processor, so the monolithic-processor resets the various registers. The quartz crystal oscillator is constituted with the oscillator, provided by the monolithic-processor itself together with a quartz crystal TX1 and capacitors C3, C4. When the voltage is stabilized after the power turning-on and resetting, the high frequency oscillating signal of the quartz crystal oscillator is pre-divided via programming, and the frequency correction is conducted accurately in accordance with the different frequency characteristics of each horn stored in the horn data memory 9 (see FIG. 3), and is corrected in accordance with the duty cycle of the target driving pulse stored in the duty cycle correcting memory and required by the horn, and then it is buffered via the output buffering and driving unit 5 and amplified by the power transistor 6 (i.e. power amplification unit) to drive the electromagnet of the horn unit 8 to force the diaphragm to sound. The power transistor may be replaced by a field effect transistor T1 or a darlington transistor. In order to prevent the power transistor T1 from being broken-down by positive or negative overvoltage generated by the electromagnet of the horn under the effect of the large current pulse, a diode D2 is used to discharge the negative overvoltage and a capacitor D5 is used to absorb the positive overvoltage.

The overvoltage protection unit 7 absorbs the positive and negative overvoltage generated by the electromagnetic coil of the electric horn under the large current pulse excitation, to protect a darlington transistor from being damaged.

When this invention is implemented, the part or. whole frequency spectrum characteristics of a certain horn may be previously solidified within the exterior or built-in memory in a microprocessor or a monolithic-processor When switched on, the devices such as ROM, EPROM, EEPROM, FLASH, or switch arrays, fuse arrays, pin arrays or other circuit element having the function of "0","1", are used to select the optimum duty cycle and frequency parameters which is in accordance with the horn sounding characteristics in said exterior or built-in memory.

Although the invention has been described with respect to the case that a monolithic-processor is used to generate a signal having constant frequency and adjustable duty cycle to control the electric horn sounding stably, this invention may develop various embodiments which are within the main spirit and the scope of this invention. For example, the monolithic-processor can be Z8, 51, PIC etc, and also can be other chips or modules including CPU, I/O, RAM, ROM (EPROM, EEPROM, FLASH or other like memory function) or other likes. The pulse signal having constant frequency and adjustable duty cycle, which is generated by the monolithic-processor circuit, can also be used in other places which requires constant frequency signal source. Since the monolithic-processor has the features such as simple structure, low cost, high accuracy of frequency and wide range of adjustable pulse signal duty cycle(1%~99%), it can be used widely. It should be understood that this invention is not limited to the paticular embodiments described in the specification, but is only defined by the following claims.

What is claimed:

1. A method of controlling constant-frequency sound production for an electric horn, said method comprising the steps of:

generating a reference pulse signal of constant frequency;

pre-dividing the frequency of the reference pulse signal generated by the generating step into a predetermined level which is near a certain frequency in the working frequency range of the horn;

conducting the frequency correction to the pulse signal generated in the step of pre-dividing according to predetermined horn frequency parameters so as to make the frequency of the output pulse signal consistent with the said certain frequency;

adjusting the duty cycle of the frequency-corrected pales signal according to predetermined duty cycle parameters, thereby to achieve its optimum horn sounding characteristics;

buffering and power-amplifying the duty-cycle-corrected signal; and sending the buffered-and-amplified signal to the electric horn to drive the electric horn to work.

2. A method as claimed in claim 1, characterized in that said certain frequency in the frequency correction step is the mechanical resonant frequency of the electric horn.

3. A method as claimed in claim 1, characterized in that said duty cycle parameters are the optimum pulse duty cycle for an electric horn to achieve its optimum sounding characteristics.

4. A method of controlling constant-frequency sound production for an electric horn via a microprocessor, said method comprising the steps of:

generating a reference pulse signal of constant frequency;

adjusting simultaneously the frequency and the duty cycle of the generated reference signal using the microprocessor according to predetermined horn frequency parameters and predetermined duty cycle parameters, so that the reference signal is directly transformed to the pulse signal having a predetermined frequency and duty cycle, wherein the said predetermined frequency is very close to the mechanical resonant frequency which is in the electric horn's working frequency range, and the predetermined duty cycle is enough for the horn to achieve its optimum sounding characteristics;

buffering and power-amplifying the signal output from the step of adjusting; and sending the buffered and amplified frequency signal to the electric horn to drive the electric horn to work.

5. An apparatus for controlling constant-frequency sound production for an electric horn, said apparatus comprising:

a reference signal generating unit for generating a reference pulse signal having constant frequency;

a pre-dividing unit for pre-dividing the frequency of the reference signal generated by the reference signal generating unit into a predetermined value which is close to a certain frequency in the horn working frequency range;

a frequency correction unit for correcting the frequency of the pulse signal generated in the pre-dividing unit according to predetermined horn frequency parameters so as to make the frequency of the output pulse signal in accordance with said certain frequency;

a duty cycle adjusting unit for adjusting the duty cycle of the frequency corrected pulse signal according to predetermined duty cycle parameters so as for the horn to achieve the optimum sounding characteristics;

a buffering and amplifying unit for buffering and then amplifying the signal output from the duty cycle correcting unit so as to send the buffered and amplified pulse signal to the electric horn to drive the electric horn to work.

6. An apparatus as claimed in claim 5, characterized in that said certain frequency is the mechanical resonant frequency of the electric horn, and said duty cycle parameters are the optimum pulse duty cycle for the electric horn to achieve its optimum sounding characteristics.

7. An apparatus as claimed in claim 5, characterized in that said pre-dividing unit, said frequency correcting unit and said duty cycle adjusting unit may be implemented by a monolithic-processor.

8. An apparatus as claimed in claim 7, characterized in that said reference signal generating unit is constituted with the external or built-in highly stable oscillator of the monolithic-processor.

9. An apparatus as claimed in claim 5, characterized in that said apparatus also includes a horn data memory device, which includes a frequency data memory for storing the horn frequency parameters used to determine said certain frequency and a pulse duty cycle correcting memory unit for storing the predetermined duty cycle parameters.

10. An apparatus as claimed in claim 9, characterized in that said horn data memory device is constituted with exterior or built-in ROM, EPROM, EEPROM, FLASH of the monolithic-processor, or fuse arrays, switch arrays, pin arrays or other circuit elements having the function of "0", "1".

11. An apparatus as claimed in claim 5, characterized in that said pre-dividing unit, said frequency correcting unit and said duty cycle adjusting unit may be constituted by a microprocessor or a chip which includes CPU, I/O, RAM, ROM (EPROM, EEPROM, FLASH or other devices having similar memory functions) or other devices having similar functions.

12. An apparatus as claimed in claim 7, characterized in that in the case that the monolithic-processor circuit's normal work is not affected, said apparatus is used as a sound-level-variable horn by changing the apparatus's supply voltage to control the output sound level of the electric horn.

13. An apparatus as claimed in claim 11, characterized in that said reference signal generating unit is constituted with a quartz crystal oscillator.

14. An apparatus as claimed in claim 5, characterized in that the part or whole frequency spectrum characteristics of a certain horn may be previously solidified within the exterior or built-in memory of a microprocessor or a monolithic-processor, wherein during working, said apparatus use ROM, EPROM, EEPROM, FLASH, or switch arrays, fuse arrays, pin arrays or other devices having the function of "0","1" to select the optimum duty cycle and frequency which is suitable to the horn sounding characteristics.

15. An apparatus as claimed in claim 5, characterized in that said apparatus also includes an overvoltage protection unit 7 for absorbing the positive or negative overvoltages generated by an electromagnetic coil of the electric horn under the large current pulse excitation and protecting the electric horn from being damaged by overvoltage.

16. A method of generating a signal source having a constant frequency and adjustable duty cycle, said method comprising the steps of:

generating a reference pulse signal of a constant frequency;

pre-dividing the reference pulse signal generated by the step of generating so that the pre-divided pulse signal frequency is in a predetermined work frequency range;

correcting the frequency of the pulse signal generated in the step of pre-dividing according to a predetermined working frequency so that the output pulse signal frequency is consistent with the required working frequency; and adjusting the duty cycle of the frequency-corrected pulse signal according to a predetermined duty cycle.

17. A method of generating a signal source as claimed in claim 16, characterized in that said method is implemented as programs by a monolithic-processor or microprocessor.

18. A method of generating a signal source as claimed in claim 16, characterized in that said duty cycle adjusting range is 1%–99%.

* * * * *